(12) United States Patent
Giassi et al.

(10) Patent No.: US 7,998,425 B2
(45) Date of Patent: Aug. 16, 2011

(54) FILTER COMPRISING A PLURALITY OF HONEYCOMB ELEMENTS JOINED TOGETHER IN AN OFFSET ASSEMBLY

(75) Inventors: Alessandro Giassi, Paris (FR); Francisco Jose Carranza, Brussels (BE)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 379 days.

(21) Appl. No.: 12/373,909

(22) PCT Filed: Jul. 6, 2007

(86) PCT No.: PCT/FR2007/051608
§ 371 (c)(1),
(2), (4) Date: Mar. 13, 2009

(87) PCT Pub. No.: WO2008/009837
PCT Pub. Date: Jan. 24, 2008

(65) Prior Publication Data
US 2009/0291033 A1 Nov. 26, 2009

(30) Foreign Application Priority Data

Jul. 18, 2006 (FR) .................................. 06 53019
Dec. 22, 2006 (FR) .................................. 06 55865

(51) Int. Cl.
*B01D 50/00* (2006.01)

(52) U.S. Cl. ........................................ 422/180; 422/177
(58) Field of Classification Search ................. 422/177, 422/180, 221, 222; 55/523; 428/116; 502/527.19
See application file for complete search history.

(56) References Cited

U.S. PATENT DOCUMENTS

| | | | |
|---|---|---|---|
| 2004/0093858 | A1 | 5/2004 | Aoki |
| 2004/0211164 | A1 | 10/2004 | Hamanaka et al. |
| 2007/0125053 | A1 | 6/2007 | Matsubara et al. |

FOREIGN PATENT DOCUMENTS

| | | |
|---|---|---|
| EP | 1 371 406 | 12/2003 |
| EP | 1 413 345 | 4/2004 |
| EP | 1 618 941 | 1/2006 |

*Primary Examiner* — Tom Duong
(74) *Attorney, Agent, or Firm* — Oblon, Spivak, McClelland, Maier & Neustadt, L.L.P.

(57) ABSTRACT

The invention relates to a structure for filtering particle-laden gases, comprising an assembly of elements of the honeycomb type linked by a joint or seal, each element incorporating a set of adjacent ducts or channels 20 of mutually parallel axes and separated by porous walls, which ducts are closed off by plugs at one or other of their ends so as to define entry chambers that open onto a gas intake face and exit chambers opening onto a gas discharge face 25, in such a way that the gas to be filtered passes through the porous walls, said structure being characterized in that its geometrical centre, in a cross section of the structure perpendicular to its main axis, does not correspond to a symmetry element of an element or of a group of elements 30 in the assembly.

9 Claims, 2 Drawing Sheets

Figure 1A:
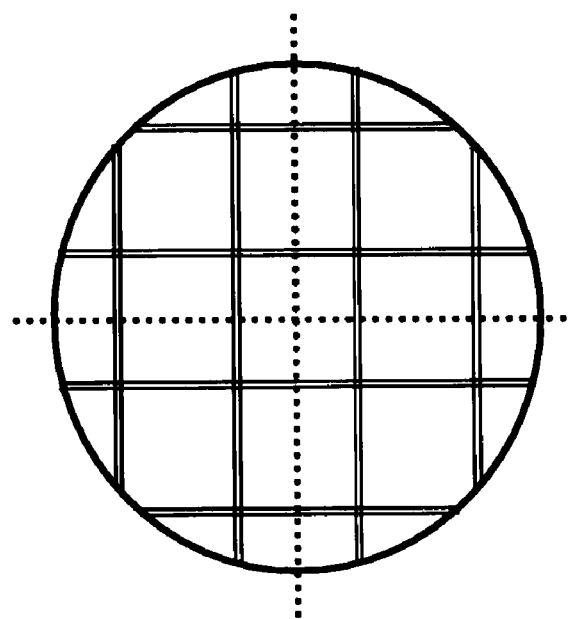

FILTER COMPRISING A PLURALITY OF HONEYCOMB ELEMENTS JOINED TOGETHER IN AN OFFSET ASSEMBLY

The invention relates to the field of filter structures of the assembled type optionally comprising a catalytic component, for example used in an exhaust line of a diesel internal combustion engine.

Filters for treating the gases and for removing the soot typically discharged by a diesel engine are well known in the prior art. All these structures usually have a honeycomb structure, one of the faces of the structure allowing the intake of the exhaust gases to be treated and the other face the discharge of the treated exhaust gases. Between the intake and discharge faces, the structure comprises a set of adjacent ducts or channels having mutually parallel axes separated by porous walls. The ducts are closed off at one or the other of their ends to bound entry chambers opening onto the intake face and exit chambers opening onto the discharge face. The channels are alternately closed off in an order such that the exhaust gases, as they pass through the honeycomb body, are forced to cross the side walls of the inlet channels to reach the outlet channels. In this way, the particulates or soot are deposited and accumulate on the porous walls of the filter body.

At the present time, filters made from a porous ceramic are used for filtering the gases, for example made from cordierite, alumina, mullite, silicon nitride, from a silicon/silicon carbide mixture or from silicon carbide.

The porous soot filters or filter structures are used on a large scale in devices for controlling the pollution of exhaust gases from a diesel internal combustion engine, or, more rarely, a gasoline engine. Although it is not limited thereto, the present invention relates in particular to such devices.

In a manner known per se, during its use in a motor vehicle exhaust line, the particulate filter is subjected to a succession of filtration (soot accumulation) and regeneration (soot removal) phases. During the filtration phases, the soot particulates emitted by the engine are retained and are deposited in the filter. During regeneration phases, the soot particulates are burned in the filter, thereby restoring its filtration properties. The porous structure is then subjected to intense thermal and mechanical stresses, which may cause microcracks which, over time, are liable to cause a severe loss of filtration capacity of the unit, or even its complete deactivation. This situation is observed in particular on large-diameter monolithic filters.

To solve these problems and to lengthen the service life of the filters, more complex filtration structures have been proposed more recently, combining several monolithic honeycomb elements in a filter block. The elements are usually joined together by adhesive using a ceramic cement, called joint cement or joint in the rest of the description. Examples of such filter structures are given for example in patent applications EP 816 065, EP 1 142 619, EP 1 455 923 or even WO2004/090294.

It is also known that the introduction of a particulate filter as previously described in the exhaust line of the engine causes a pressure drop that is liable to degrade the performance thereof. The assembled filter must consequently be configured so as to avoid such deterioration or at least reduce it to the minimum.

The particulate filters according to the invention are manufactured by assembling parallelepiped shaped, usually square elements with a joint cement. The thickness of the joint, between two contiguous elements, is about 1 to 3 mm. After curing and setting of the cement, a green shape is obtained, having sufficient mechanical strength to be machined, in order to obtain a filter shape adapted to its housing in the exhaust line. In general, the filter is completed by a step of covering with a coating cement that insulates the assembled filter. An additional requirement necessary for the robustness of the filter in operation pertains to the method for manufacturing the structure itself and more particularly to the question of the machining of the various elements. Thus, after machining, it has appeared that if the residual part of the outermost elements of the structure is too small, an excessive risk of detachment of the material exists, with the corollary of a mechanical weakness of the end structure obtained, and even, in extreme cases, complete stripping of the element from its cement. It has been determined by the applicant that the residual volume of the outermost elements, after machining, must typically be lower than about one-sixteenth and preferably one-eighth of the initial volume before machining, in order to minimize the risk of such situations occurring and thereby to make the method compatible with industrial production.

The assembled filters described in prior publications and currently sold all have at least one axis of symmetry. The most characteristic shapes are circular, as described in applications EP 1 455 923 or WO 2004/090294, or ovoid, as described in applications EP 816 065 or even EP 1 626 037. Although the two preceding shapes are the most common, other very different shapes have also been described.

The unit elements, for example, typically have a cross section width of between 30 mm and 50 mm. By way of example, 14 unit elements having a square cross section and a width of 36 mm are required to synthesize a round filter having a diameter of about 14 cm.

Figure 1B:
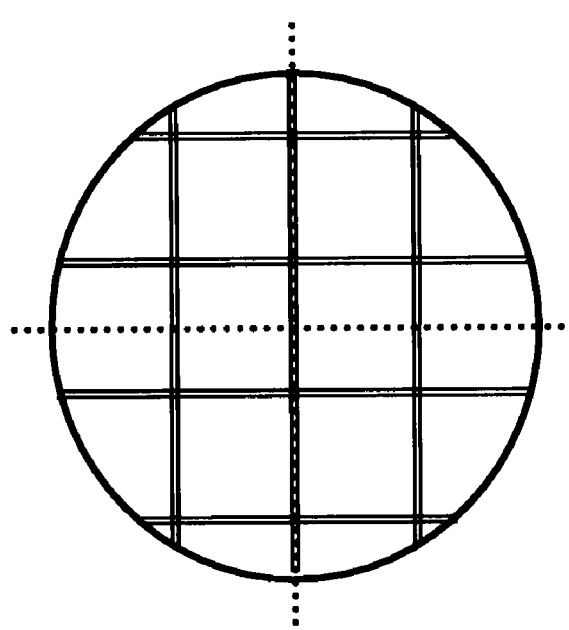
Figure 1C:
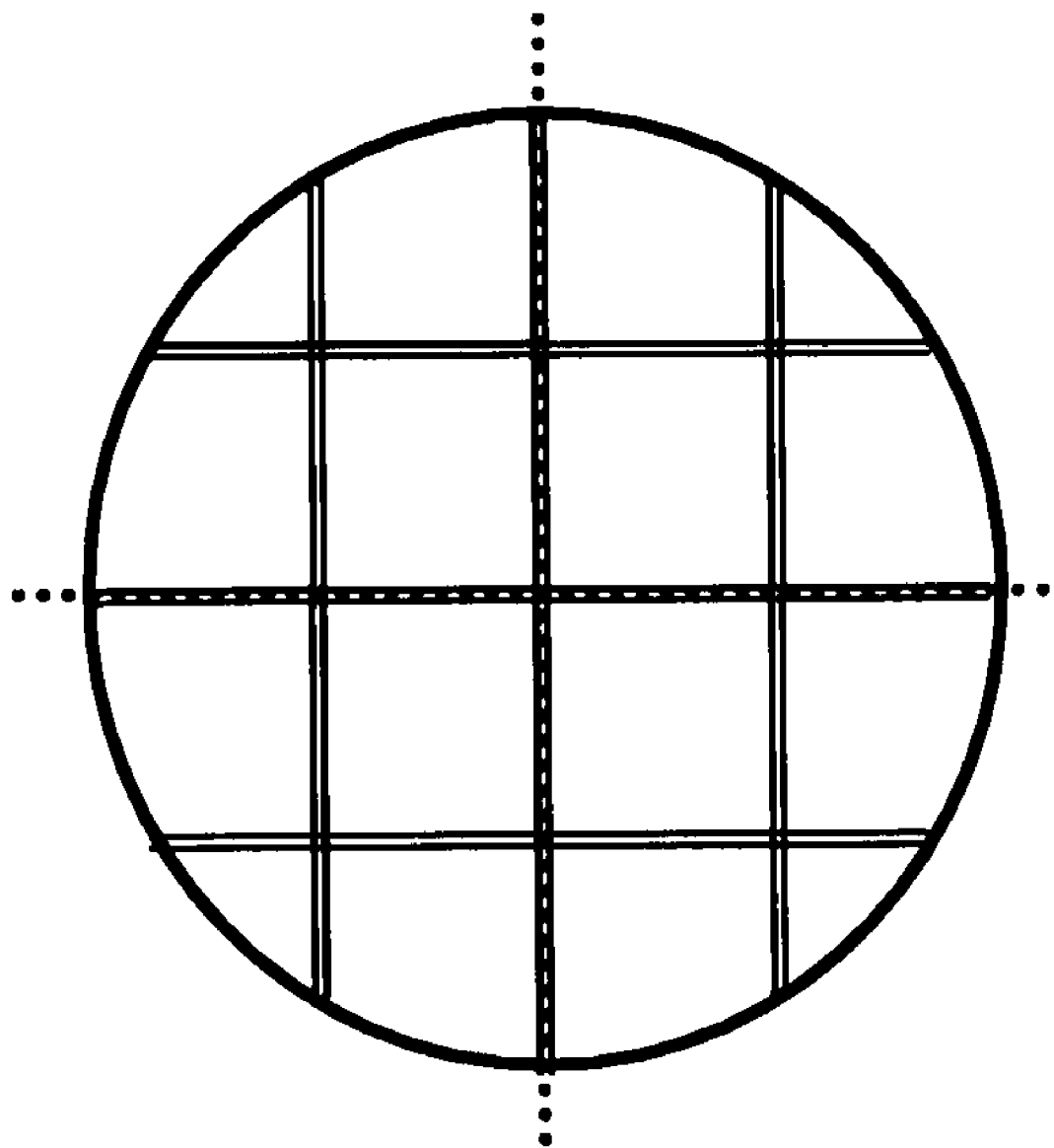

In all these assemblies, the geometrical center of the filter, in a cross sectional plane, coincides either with the center of one of the elements, or with a position occupied by the joint cement forming the junction between two elements, or even with a position of the joint cement forming the junction between four elements of the filter, as shown in FIGS. 1a, 1b and 1c, respectively.

Patent application EP 1 371 406 describes an assembled structure in which the shortest distance between the center of gravity of a section of said structure and the joint surface is shorter than ¹⁄₁₀ of the greatest distance between said center and the circumference of the filter.

It is therefore the object of the invention to provide a honeycomb structure of a novel type, in order to address all the problems previously described.

More precisely, the invention relates to a filter structure comprising the assembly of a plurality of monolithic honeycomb elements as previously described, and combining, for maximum filtration efficiency and long-term use, the following properties:

a minimum pressure drop in operation, typically on an exhaust line of an internal combustion engine, sufficient thermomechanical resistance to withstand the operating stresses of the filter, a minimum volume of the outer elements in the final assembly, that is after machining, at least equal to one-sixteenth and preferably at least equal to one-eighth of the volume of an element in the central position.

The filter structure according to the invention is characterized by an uncentered or offset assembly of the elements, that is, the geometrical center of said structure does not correspond to the center of an element or does not coincide with a symmetry element existing between two or more of said elements, for example as shown in FIGS. 1a, 1b or 1c.

In its most general embodiment, the present invention relates to a structure for filtering particulate-laden gases, comprising an assembly of elements of the honeycomb type linked by a joint, each element incorporating a set of adjacent ducts or channels having mutually parallel axes and separated by porous walls, said ducts being closed off by plugs at one or the other of their ends so as to bound entry chambers that open onto a gas intake face and exit chambers opening onto a gas discharge face, in such a way that the gas to be filtered passes through the porous walls, said structure being characterized in that its geometrical center, in a cross section of the structure perpendicular to its main axis, does not correspond to a symmetry element of an element or of a group of elements in the assembly, and in that it answers to the following geometrical characteristics, in said cross sectional plane:

if $0<D\leq 3\times L_e+4\times L_j$ or if $4\times L_e+5\times L_j\leq D\leq 4.25\times L_e+4\times L_j$ or if $6\times L_e+5\times L_j\leq D\leq 7\times L_e+6\times L_j$ or if $8\times L_e+7\times L_j\leq D\leq 8.5\times L_e+6\times L_j$, then d is between 0 exclusive and $0.1\times L_j\times L_e$, if $3\times L_e+4\times L_j\leq D\leq 3.5\times L_e+5\times L_j$ or if $4.25\times L_e+5\times L_j\leq D\leq 5\times L_e+5\times L_j$, then d is between $0.2\times L_j\times L_e$ and $0.35\times L_j\times L_e$, Where D is the segment having the greatest distance joining two points of the filter envelope and passing through the geometrical center of the filter, or even through the main axis of symmetry of the filter, d is the distance between the center of the element located in the central position in the assembly and the geometrical center of the filter, Le is the width of a whole unit element and Lj is the average thickness of the joint.

The parameters D, d, Lj and $L_e$ correspond to the nominal values and are expressed in mm.

Preferably, according to the invention, the segment D also passes through the geometrical center of the filter, or even through the main axis of symmetry of the filter.

In the context of the present invention, SiC based material means that said material comprises at least 30% SiC by weight, preferably at least 70% SiC by weight, and most preferably at least 98% SiC by weight.

Preferably, the filter structure comprises a plurality of filter elements based on SiC joined together by a joint cement having a thermal conductivity of at least 0.3 W/m·K between 20 and 800° C. A high thermal conductivity of the joint cement advantageously serves to make the heat transfers in the filter uniform, while a low thermal conductivity lower than 0.3 W/m·K (typically measured at a temperature of 600° C.) contributes to increasing the thermal gradients and the thermomechanical stresses in the joint and in the filter.

In general, the cross section of one element is a parallelepiped and preferably square, and in which the width of the element is between 30 mm and 50 mm.

Typically, the average thickness of the joint is between 0.5 and 4 mm.

Advantageously, the wall thickness is between 200 and 500 µm.

The structure may further comprise a catalytic coating for the treatment of the polluting gases such as CO or HC and NOx.

A typical structure according to the invention comprises a plurality of honeycomb elements joined together by a joint cement, the number of channels in the filter elements being between about 7.75 and about 62 per cm$^2$, said channels having a cross section of about 0.5 to 9 mm$^2$.

The invention also relates to the use of a structure as claimed in one of the preceding claims as a particulate filter in an exhaust line of a diesel or gasoline engine, preferably a diesel engine.

The following examples, which are nonlimiting, will provide a better understanding of the invention and of its advantages.

EXAMPLES

In the following examples, an attempt has been made to synthesize a series of filters meeting the requirements according to the present invention and illustrating its advantages compared to another series of filters, given for comparison and not meeting the criteria according to the invention.

All the filters were synthesized by the following method:
1) Synthesis of the Elements:

The unit elements were synthesized as follows: In a mixer, using well known techniques, an initial mixture was prepared of powders of silicon carbide, a pore forming agent of the polyethylene type, and an organic binder of the methylcellulose type.

Water was added to the powder mixture and mixing continued to obtain a uniform slurry of which the plasticity allowed the extrusion, through a die, of monolithic honeycomb structures having a square cross section and dimensional characteristics given in Table 1:

TABLE 1

| Channel geometry | Square |
|---|---|
| Channel density | 180 cpsi (channels per square inch, 1 inch = 2.54 cm) |
| Wall thickness | 350 µm |
| Length | 15.2 cm |
| Width | 3.6 cm |
| Volume | 2.47 liters |
| Porosity | About 47% |
| Median pore diameter | About 15 µm |

The green monoliths obtained were then dried by microwave for sufficient time to reduce the nonchemically bound water content to less than 1% by weight.

The channels of each face of the monolith were alternatively closed off by well known techniques, for example as described in application WO2004/065088.

The monolith was then fired with a temperature rise of 20° C./hour until reaching a temperature of about 2200° C., which was maintained for two hours.

A series of silicon carbide monoliths was finally obtained, having substantially identical microstructural characteristics.
2) Assembly of the Filter According to the teaching of patent application EP 816 065, the elements were then joined together by adhesive using a ceramic cement and then machined, in order to form filters having an appropriate diameter.

A joint cement was prepared by mixing:
 85% by weight of an SiC powder having a particle size distribution between 10 and 200 µm,
 4% by weight of a calcined alumina powder sold by Almatis,
 10% by weight of a reactive alumina powder sold by Almatis,
 0.8% by weight of a temporary binder and plasticizer of the cellulose type,
 0.2% by weight of deflocculant of the TPPNa type (sodium tripolyphosphate).

A quantity of water was added corresponding to 30% of the weight of this mixture to obtain a cement having a suitable viscosity.

Following this synthesis procedure, various filters according to the invention or comparative filters were prepared, by modifying the shape of the filter, its diameter, and the position and size of the elements in the filter with regard to its geometrical center.

A test was performed with a low-heat-conducting cement by mixing:
- 44% by weight of an SiC powder having a particle size distribution between 10 and 200 µm,
- 5% by weight of a calcined alumina powder sold by Almatis,
- 10% by weight of a reactive alumina powder sold by Almatis,
- 40% of hollow spheres sold by Envirospheres under the name "e-spheres", having a typical chemical composition of 60% $SiO_2$ and 40% $Al_2O_3$ and a median size of about 100 µm,
- 0.8% by weight of a temporary binder and plasticizer of the cellulose type,
- 0.2% by weight of deflocculant of the TPPNa type (sodium tripolyphosphate).

A quantity of water was added corresponding to 30% of the weight of this mixture to obtain a cement having a suitable viscosity.

Prior to assembly, depending on the dimensions and shape of the final filter, certain unit elements were cut along their main axis, that is in the lengthwise direction, so as to use the minimum number of said elements required for each assembly.

The larger elements were prepared by using an extrusion die adapted to the desired size of the element.

The properties of the filters were measured by the following procedures:

A. Measurement of Pressure Drop:

In the context of the present invention, pressure drop means the differential pressure between the upstream and downstream ends of the filter. The pressure drop was measured by the techniques of the art, for an air flow rate of 300 $m^3/h$ in a stream of ambient air.

B. Measurement of Thermomechanical Resistance

The various filters were mounted on an exhaust line of a 2.0 L diesel engine run at full speed (4000 rpm) for 30 minutes, and then dismantled and weighed in order to determine their initial weight. The filters were then reassembled on the engine test bench with a speed of 3000 rpm and a torque of 50 Nm in order to obtain soot loads of 8 g/l in the filter.

The soot-laden filters were reassembled on the line to undergo severe regeneration defined as follows: after stabilization at an engine speed of 1700 rpm for a torque of 95 Nm for 2 minutes, post-injection was carried out with 70° phasing for a post-injection rate of 18 $mm^3$/stroke. Once the soot combustion was initiated, more precisely when the pressure drop fell for at least 4 seconds, the engine speed was reduced to 1050 rpm for a torque of 40 Nm for 5 minutes in order to accelerate the combustion of the soot. The filter was then subjected to an engine speed of 4000 rpm for 30 minutes to remove the remaining soot.

The degree of cracking of the filter is preferably measured using a nondestructive method, described in patent application FR-A-2 840 405, comprising in particular the measurement of the propagation of ultrasonic waves across the filter. Among the propagation parameters (propagation velocity, wave frequency and amplitude), the velocity proved to be a reliable indicator of the quantity and gravity of the cracks. An excessive decrease in propagation velocity compared to the ultrasonic wave propagation velocity through the new material can in fact be correlated with the presence of cracks.

The cracking index corresponds in percentage to the variation in propagation velocity of the ultrasonic waves through the regenerated filter compared to the new filter before regeneration, the two measurements being taken by the same operating procedure. This index is generally negative.

The ultrasonic propagation velocity is measured at a typical frequency of 50 kHz. The equipment used may for example be the unit sold by CNS Farnell under the name "Pundit Plus".

Table 2 below, for the various arrangements of the synthesized filters, according to the invention or outside it, serves to compare the performance obtained in terms of pressure drop and mechanical strength.

TABLE 2

| | | Examples | | | | | | | |
|---|---|---|---|---|---|---|---|---|---|
| | Units | Comp 1a | Ex 1 | Comp 2a | Comp 2b | Ex 2 | Comp 3a | Ex 3 | Comp 4a |
| Diameter family | | 1 | 1 | 2 | 2 | 2 | 3 | 3 | 4 |
| General shape | | Circular | Circular | Circular | Circular | Circular | Circular | Circular | Circular |
| Filter diameter D | mm | 103 | 103 | 118 | 118 | 118 | 156 | 156 | 176 |
| Width of unit contact | mm | 35.8 | 35.8 | 35.8 | 35.8 | 35.8 | 35.8 | 35.8 | 35.8 |
| Average joint thickness | mm | 2 | 2 | 2 | 2 | 2 | 2 | 2 | 2 |
| Arrangement | | Type FIG. 1c | Offset compared to FIG. 1a | Type FIG. 1c | Type FIG. 1a | Offset compared to FIG. 1b | Type FIG. 1c | Offset compared to FIG. 1a | Type FIG. 1c |
| Cement thermal conductivity | W/m·k | 1.9 | 1.9 | 1.9 | 1.9 | 1.9 | 1.9 | 1.9 | 1.9 |
| Distance d | mm | 27 | 2 | 27 | 0 | 17 | 27 | 2 | 27 |
| No. of elements | | 8 | 7 | 14 | 13 | 12 | 18 | 17 | 28 |
| Mechanical strength of peripheral elements | | OK | OK | OK | * | OK | OK | OK | OK |
| Thermomechanical strength (cracking index) | % | 0 | 0 | −3.5 | −3 | −0.6 | 0 | 0 | −1.8 |
| Pressure drop | mbar | 43.5 | 38.9 | 28.0 | 25.8 | 26.1 | 13.0 | 12.6 | 9.3 |

| | | Examples | | | | | |
|---|---|---|---|---|---|---|---|
| | Units | Ex 4 | Comp 5a | Comp 6a | Ex 6 | Comp 7a | Ex 7 |
| Diameter family | | 4 | Low thermally conducting cement | Other noncircular filter shape | | With different element size | |
| General shape | | Circular | Circular | Ellipsoidal | | Circular | |
| Filter diameter D | mm | 176 | 156 | 195 × 102 | 195 × 102 | 156 | 156 |
| Width of unit contact | mm | 35.8 | 35.8 | 35.8 | 35.8 | 45 | 45 |
| Average joint thickness | mm | 2 | 2 | 2 | 2 | 2 | 2 |

TABLE 2-continued

| Arrangement | | Offset compared to FIG. 1b | Offset compared to FIG. 1a | Type FIG. 1b | Offset compared to FIG. 1a | Type FIG. 1c | Offset compared to FIG. 1b |
|---|---|---|---|---|---|---|---|
| Cement thermal conductivity | W/m · k | 1.9 | 0.2 | 1.9 | 1.9 | 1.9 | 1.9 |
| Distance d | mm | 17 | 2 | 19 | 2 | 32 | 22 |
| No. of elements | | 22 | 17 | 16 | 13 | 14 | 11 |
| Mechanical strength of peripheral elements | | OK | OK | OK | OK | OK | OK |
| Thermomechanical strength (cracking index) | % | −1.2 | −15 | −6 | −4.8 | 0 | 0 |
| Pressure drop | mbar | 9.0 | 12.7 | 18.0 | 17.5 | 12.5 | 12.3 |

* Problem of mechanical strength: peripheral elements too brittle.

In Table 1, it may be observed that examples 1, 2, 3, 4 and 7 according to the invention, compared with examples 1a, 2a and 2b, 3a, 4a, 6a and 7a, outside the field of the invention, respectively, reveal at least as satisfactory thermomechanical behavior, as measured in terms of cracking index and pressure drop.

It may also be observed that the comparative filter 2b reveals a lower pressure drop than the product of the invention, but displays excessively low mechanical strength of some of its peripheral elements for application as a particulate filter. This low mechanical strength was attributed to the residual volume of certain peripheral elements of the filter, less than 1/16, or even 1/8 of the volume of the element in the central position.

The comparative example 5a, differentiated by a very poor conducting cement, demonstrates much weaker mechanical behavior than example 3 according to the invention.

Furthermore, for equivalent dimensions and shapes, Table 2 shows that the structures according to the invention require the minimum number of unit elements for their operational assembly.

The invention claimed is:

1. A structure for filtering particulate-laden gases, comprising an assembly of elements of the honeycomb type linked by a joint, each element incorporating a set of adjacent ducts or channels having mutually parallel axes and separated by porous walls, said ducts being closed off by plugs at one or the other of their ends so as to bound entry chambers that open onto a gas intake face and exit chambers opening onto a gas discharge face, in such a way that the gas to be filtered passes through the porous walls, said structure being characterized in that its geometrical center, in a cross section of the structure perpendicular to its main axis, does not correspond to a symmetry element of an element or of a group of elements in the assembly, and in that it answers to the following geometrical characteristics:

if $0 < D \leq 3 \times L_e + 4 \times L_j$ or if $4 \times L_e + 5 \times L_j \leq D \leq 4.25 \times L_e + 4 \times L_j$ or if $6 \times L_e + 5 \times L_j \leq D \leq 7 \times L_e + 6 \times L_j$ or if $8 \times L_e + 7 \times L_j \leq D \leq 8.5 \times L_e + 6 \times L_j$, then d is between 0 exclusive and $0.1 \times L_j \times L_e$, and if $3 \times L_e + 4 \times L_j \leq D \leq 3.5 \times L_e + 5 \times L_j$ or if $4.25 \times L_e + 5 \times L_j \leq D \leq 5 \times L_e + 5 \times L_j$ or if $5.6 \times L_e + 3 \times L_j \leq D \leq 6 \times L_e + 5 \times L_j$, then d is between $0.2 \times L_j \times L_e$ and $0.35 \times L_j \times L_e$, where D is the segment having the greatest distance joining two points of the filter envelope and passing through the geometrical center of the filter, or even through the main axis of symmetry of the filter, d is the distance between the center of the element located in the central position in the assembly and the geometrical center of the filter, Le is the width of a whole unit element and Lj is the average thickness of the joint.

2. The filter structure as claimed in claim 1, in which the segment D also passes through the geometrical center of the filter, or even through the main axis of symmetry of the filter.

3. The filter structure as claimed in claim 1, comprising a plurality of filter elements based on SiC joined together by a joint cement having a thermal conductivity of at least 0.3 W/m·K between 20 and 800° C.

4. The structure as claimed in claim 1, in which the cross section of one element is a parallelepiped and preferably square, and in which the width of the element is between 30 mm and 50 mm.

5. The structure as claimed in claim 1, in which the average thickness of the joint is between 0.5 and 4 mm.

6. The structure as claimed in claim 1, in which the wall thickness is between 200 and 500 μm.

7. The structure as claimed in claim 1, further comprising a catalytic coating for the treatment of the polluting gases CO or HC and NOx.

8. The structure as claimed in claim 1, in which a plurality of honeycomb elements are joined together by a joint cement, the number of channels in the filter elements being between about 7.75 and about 62 per $cm^2$, said channels having a cross section of about 0.5 to 9 $mm^2$.

9. A particulate filter in an exhaust line of a diesel or gasoline engine comprising the structure as claimed in claim 1.

* * * * *